(12) United States Patent
Jung

(10) Patent No.: US 10,072,799 B2
(45) Date of Patent: Sep. 11, 2018

(54) HYDROGEN FILLING METHOD FOR FUEL CELL VEHICLE

(71) Applicant: Hyundai Motor Company, Seoul (KR)

(72) Inventor: Young Woo Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 15/264,826

(22) Filed: Sep. 14, 2016

(65) Prior Publication Data

US 2017/0314734 A1    Nov. 2, 2017

(30) Foreign Application Priority Data

Apr. 28, 2016  (KR) .......................... 10-2016-0052223

(51) Int. Cl.
| | | |
|---|---|---|
| *B65B 1/04* | (2006.01) | |
| *F17C 5/06* | (2006.01) | |
| *H01M 8/0432* | (2016.01) | |
| *H01M 8/04082* | (2016.01) | |

(52) U.S. Cl.
CPC ........... F17C 5/06 (2013.01); H01M 8/04373 (2013.01); *F17C 2201/035* (2013.01); *F17C 2205/0153* (2013.01); *F17C 2205/0161* (2013.01); *F17C 2221/012* (2013.01); *F17C 2223/036* (2013.01); *F17C 2225/036* (2013.01); *F17C 2227/04* (2013.01); *F17C 2250/01* (2013.01); *F17C 2250/032* (2013.01); *F17C 2260/021* (2013.01); *F17C 2260/022* (2013.01); *F17C 2260/025* (2013.01); *F17C 2265/065* (2013.01); *F17C 2270/0763* (2013.01); *H01M 8/04201* (2013.01); *H01M 2250/20* (2013.01); *Y02T 90/32* (2013.01)

(58) Field of Classification Search
CPC ........ F17C 2201/035; F17C 2205/0153; F17C 2205/0161; F17C 2221/012; F17C 2223/036; F17C 2225/036; F17C 2227/04; F17C 2250/01; F17C 2250/032; F17C 2260/021; F17C 2260/022; F17C 2260/025; F17C 2265/065; F17C 2270/0763; F17C 5/06; H01M 2250/20; H01M 8/04089; H01M 8/04208; H01M 8/04776

See application file for complete search history.

(56) References Cited

U.S. PATENT DOCUMENTS

| | | | | |
|---|---|---|---|---|
| 8,942,873 B2 * | 1/2015 | Kim | ........................ | F02D 45/00 |
| | | | | 320/155 |
| 9,662,956 B2 * | 5/2017 | Kim | ...................... | B60G 17/017 |
| 9,764,271 B2 * | 9/2017 | Kim | .................... | B01D 53/0423 |
| 9,766,194 B2 * | 9/2017 | Kim | ........................ | G01N 25/72 |

(Continued)

FOREIGN PATENT DOCUMENTS

| | | |
|---|---|---|
| JP | 4367830 B2 | 11/2009 |
| JP | 2015-169325 A | 9/2015 |

(Continued)

*Primary Examiner* — Jason K Niesz

(74) *Attorney, Agent, or Firm* — Mintz Levin Cohn Ferris Glovsky and Popeo, P.C.; Peter F. Corless

(57) ABSTRACT

A hydrogen filling method for a fuel cell vehicle includes filling a hydrogen tank of the fuel cell vehicle with hydrogen using a hydrogen dispenser by sequentially using a low-pressure storage tank of the fuel cell vehicle, a medium-pressure storage tank of the fuel cell vehicle, and a high-pressure storage tank of the fuel cell vehicle.

5 Claims, 5 Drawing Sheets

(56) References Cited

U.S. PATENT DOCUMENTS

| | | | |
|---|---|---|---|
| 2009/0030625 A1* | 1/2009 | Jung | B60L 11/1881 702/60 |
| 2009/0062581 A1* | 3/2009 | Appel | C10G 1/002 585/241 |
| 2010/0116129 A1* | 5/2010 | Molaison | B01D 53/1462 95/44 |
| 2013/0139897 A1* | 6/2013 | Kim | F17C 5/007 137/2 |
| 2015/0053274 A1* | 2/2015 | Gordon | G01F 1/34 137/14 |
| 2015/0218469 A1* | 8/2015 | Sastri | C02F 1/06 252/373 |
| 2017/0023180 A1* | 1/2017 | Petit | F17C 5/06 |
| 2017/0059089 A1* | 3/2017 | Uchida | F17C 5/06 |
| 2017/0130901 A1* | 5/2017 | Sloan | F17C 5/06 |
| 2017/0314734 A1* | 11/2017 | Jung | H01M 8/04208 |

FOREIGN PATENT DOCUMENTS

| | | | |
|---|---|---|---|
| JP | WO 2015170670 A1 * | 11/2015 | F17C 5/06 |
| JP | 2015-214993 A | 12/2015 | |
| KR | 10-1272589 B1 | 6/2013 | |
| KR | 10-1337908 B1 | 12/2013 | |
| KR | 10-1373441 B1 | 3/2014 | |

\* cited by examiner

HYDROGEN FILLING METHOD FOR FUEL CELL VEHICLE

CROSS-REFERENCE TO RELATED APPLICATION

This application claims the benefit of and priority to Korean Patent Application No. 10-2016-0052223, filed on Apr. 28, 2016, in the Korean Intellectual Property Office, the disclosure of which is incorporated herein in its entirety by reference.

TECHNICAL FIELD

The present disclosure relates generally to a hydrogen filling method for a fuel cell vehicle and, more particularly, to a technology for safely filling a fuel cell vehicle with the maximum amount of hydrogen fuel.

For the purposes of the present disclosure, a hydrogen tank refers to a tank provided in a fuel cell vehicle, and a storage tank refers to a tank connected to a hydrogen dispenser of a hydrogen station.

BACKGROUND

While internal combustion engine vehicles run by the rotational power of an internal combustion engine caused by the explosion occurring during the combustion of fossil fuels with oxygen from the air, fuel cell vehicles run by rotational power of an electric motor that is driven using electrical energy generated by a fuel cell stack. The fuel cell stack, which is a power source of the fuel cell vehicle, generates electrical energy through an electrochemical reaction of hydrogen supplied by a high-pressure hydrogen tank in the vehicle with oxygen from the air supplied by an air supply device.

In a fuel cell vehicle, it is important to safely store hydrogen fuel in a compact tank. To this end, various hydrogen storage techniques that meet the requirements of increased mileage and safety have been developed. For instance, a lightweight, high-strength hydrogen tank that can withstand high-pressure is generally used by filling the interior of the hydrogen tank with hydrogen. In order to secure spaces for all passengers and enough mileage, the interior of the tank may be filled with hydrogen under high-pressure.

In general, the specification of a hydrogen tank for fuel cell vehicles is 350 bar or 700 bar. A reinforcing material such as carbon fiber may be wound on the exterior of a tank main body made of metal such as an aluminum alloy, or plastic in order to ensure sufficient internal pressure resistance.

Meanwhile, the fuel cell vehicle may be filled with hydrogen from a hydrogen dispenser. For safe and quick refueling, the fuel cell vehicle may measure the pressure and temperature of the hydrogen tank and transmit the measured results to the hydrogen dispenser. Therefore, if there is a communication error between the fuel cell vehicle and the hydrogen dispenser, it becomes difficult to normally fuel the vehicle with hydrogen.

In a conventional hydrogen filling method for a fuel cell vehicle, when there is a communication error between a fuel cell vehicle and a hydrogen dispenser, the fuel cell vehicle is filled with an amount of hydrogen less than the maximum filling amount for sufficient time (e.g., at least 10 minutes) in consideration of a possible risk of explosion that may occur while fueling. Consequently, it is difficult to fuel the vehicle with the maximum amount of hydrogen quickly and safely.

For example, even when the capacity of the hydrogen tank provided in the fuel cell vehicle is 700 bar, the fuel cell vehicle sets a target filling amount to 600 bar due to the risk of explosion and is filled with hydrogen slowly. Therefore, it is difficult to fuel the vehicle with the maximum amount of hydrogen and difficult to maintain the maximum mileage.

SUMMARY

The present disclosure has been made to solve the above-mentioned problems occurring in the related art while advantages achieved by the prior art are maintained intact.

An aspect of the present disclosure provides a hydrogen filling method for a fuel cell vehicle, characterized by filling a hydrogen tank of the fuel cell vehicle with hydrogen while sequentially using a plurality of storage tanks (e.g., hydrogen storage tanks provided in a hydrogen station) having different levels of pressure, thereby filling the hydrogen tank with the maximum amount of hydrogen fuel quickly and safely even during a communication error between a hydrogen dispenser and the fuel cell vehicle making it difficult to monitor the pressure and temperature of the hydrogen tank from the fuel cell vehicle.

The objects of the present disclosure are not limited to the foregoing objects, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by the elements claimed in the claims and a combination thereof.

According to embodiments of the present disclosure, a hydrogen filling method for a fuel cell vehicle includes: filling a hydrogen tank of the fuel cell vehicle with hydrogen using a hydrogen dispenser by sequentially using a low-pressure storage tank of the fuel cell vehicle, a medium-pressure storage tank of the fuel cell vehicle, and a high-pressure storage tank of the fuel cell vehicle.

The filling of the hydrogen tank may include: filling the hydrogen tank using the low-pressure storage tank when there is an infrared (IR) communication error between the hydrogen dispenser and the fuel cell vehicle; filling the hydrogen tank using the medium-pressure storage tank unless hydrogen stored in the low-pressure storage tank moves to the hydrogen tank; filling the hydrogen tank using the high-pressure storage tank unless hydrogen stored in the medium-pressure storage tank moves to the hydrogen tank; and completing the filling of the hydrogen tank unless hydrogen stored in the high-pressure storage tank moves to the hydrogen tank.

The method may further include determining whether or not the hydrogen stored in any of the low-pressure storage tank, the medium-pressure storage tank, and the high-pressure storage tank moves to the hydrogen tank using a flowmeter.

While being filled with hydrogen, the fuel cell vehicle may output a warning signal when the temperature of the hydrogen tank exceeds a threshold value, thereby preventing a risk of explosion of the hydrogen tank.

The method may further include: maintaining a first reference pressure in the low-pressure storage tank through a compressor; maintaining a second reference pressure in the medium-pressure storage tank through a compressor; and/or maintaining a third reference pressure in the high-pressure storage tank through a compressor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

The above and other objects, features and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 1:
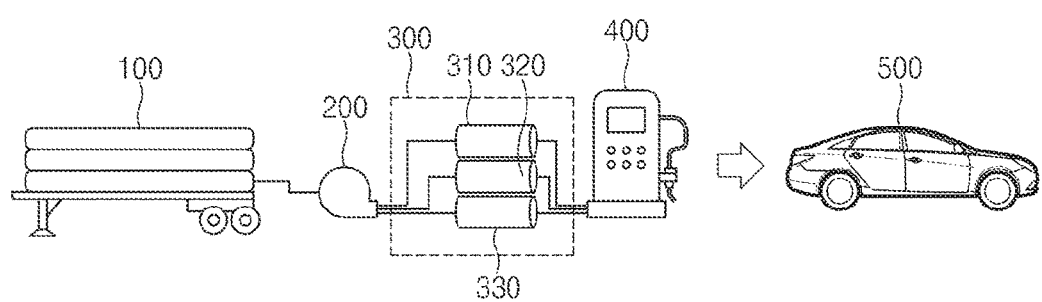
FIG. 1 illustrates a hydrogen filling system for a fuel cell vehicle according to embodiments of the present disclosure.

Referring now to the presently disclosed embodiments, FIG. 1 illustrates a hydrogen filling system for a fuel cell vehicle according to embodiments of the present disclosure.

As illustrated in FIG. 1, a hydrogen station may receive hydrogen from a hydrogen tube 100 delivered by a trailer, compress hydrogen through a compressor 200, and store the compressed hydrogen in a storage tank 300. The compressed hydrogen stored in the storage tank 300 may be fed to a fuel cell vehicle 500 through a hydrogen dispenser 400. The storage tank 300 includes a low-pressure storage tank 310 (for example, 0-200 bar), a medium-pressure storage tank 320 (for example, 200-500 bar), and a high-pressure storage tank 330 (for example, 500-700 bar).

In addition, the compressor 200 may perform a compression process periodically to maintain the pressure of the low-pressure storage tank 310 as a reference value (e.g., 200 bar) (or "first reference pressure"), perform a compression process periodically to maintain the pressure of the medium-pressure storage tank 320 as a reference value (e.g., 500 bar) (or "second reference pressure"), and perform a compression process periodically to maintain the pressure of the high-pressure storage tank 330 as a reference value (e.g., 700 bar) (or "third reference pressure").

Meanwhile, infrared (IR) communications may be performed between the hydrogen dispenser 400 and the fuel cell vehicle 500, and the hydrogen dispenser 400 may receive the pressure and temperature of a hydrogen tank from the fuel cell vehicle 500 and use the pressure and temperature as parameters for safe hydrogen fueling. The hydrogen dispenser 400 may be provided with an IR receiver (not shown), and the fuel cell vehicle 500 may be provided with an IR transmitter (not shown).

In addition, the hydrogen dispenser 400 may be provided with a flowmeter to monitor flow rate changes. In other words, it may be determined whether or not hydrogen moves from the storage tank 300 to the hydrogen tank of the fuel cell vehicle 500. That is, it may be determined whether or not the hydrogen tank of the fuel cell vehicle 500 is being filled with hydrogen.

Figure 2:
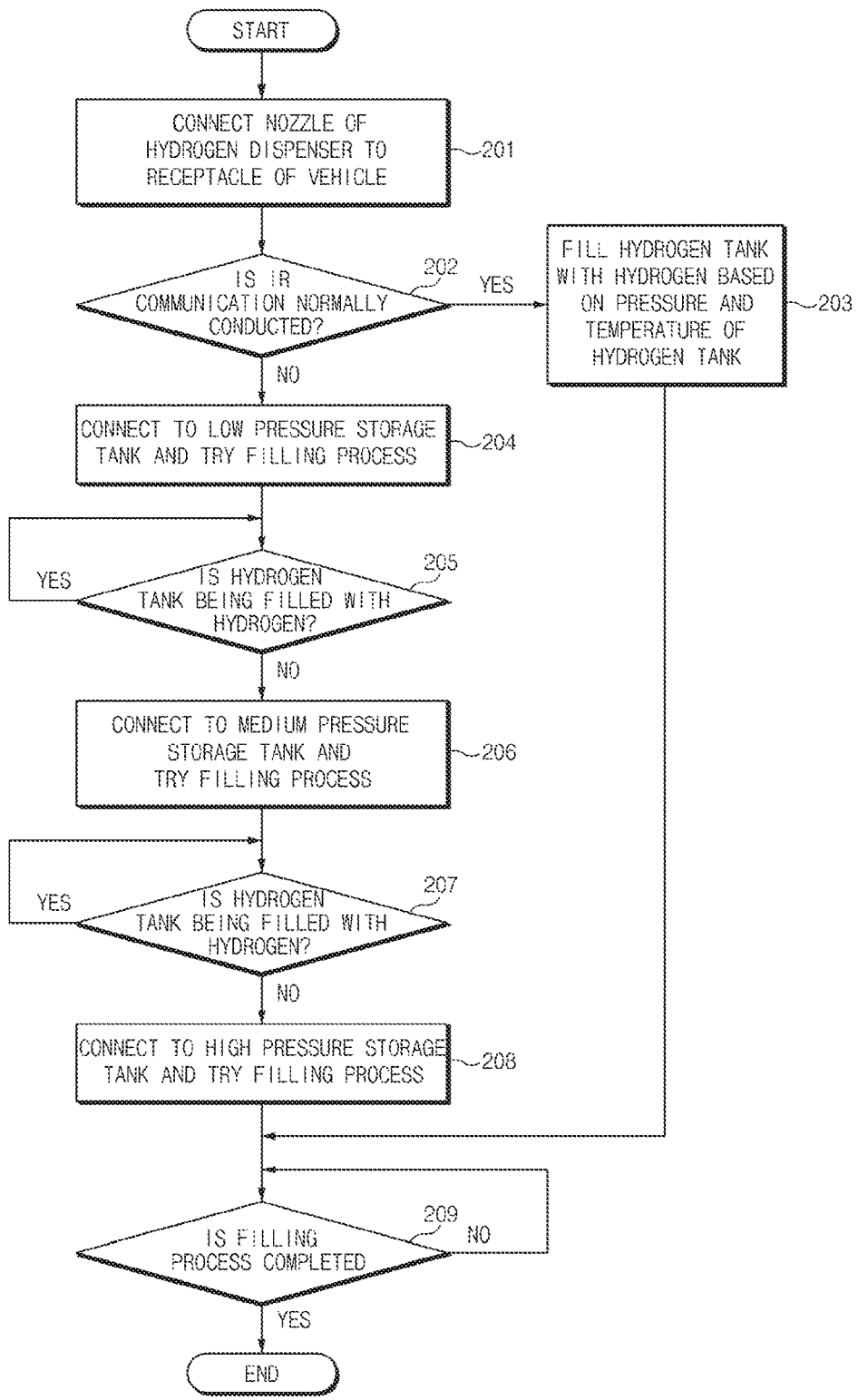
FIG. 2 illustrates a flowchart of a hydrogen filling method for a fuel cell vehicle according to embodiments of the present disclosure.

FIG. 2 illustrates a flowchart of a hydrogen filling method for a fuel cell vehicle according to embodiments of the present disclosure. The method is performed by the hydrogen dispenser 400.

First, when a nozzle of the hydrogen dispenser 400 is connected to a receptacle of the fuel cell vehicle 500 in operation 201, it may be determined whether or not IR communication is normally performed in operation 202. In other words, it may be determined whether or not the pressure and temperature of the hydrogen tank is received from the fuel cell vehicle 500 through the IR communication.

As a result of the determination in operation 202, when the IR communication is normally performed, the fuel cell vehicle may be filled with hydrogen on the basis of the received pressure and temperature of the hydrogen tank in operation 203. Here, a well-known filling process may be used.

On the other hand, when the IR communication is not normally performed, the hydrogen dispenser 400 may connect the fuel cell vehicle 500 to the low-pressure storage tank 310 to try a filling process in operation 204.

Next, it may be determined whether or not hydrogen stored in the low-pressure storage tank 310 moves to the hydrogen tank of the fuel cell vehicle 500 in operation 205. In other words, it may be determined whether or not hydrogen stored in the low-pressure storage tank 310 is being fed to the hydrogen tank of the fuel cell vehicle 500.

As a result of the determination in operation 205, when the hydrogen tank of the fuel cell vehicle 500 is being filled with hydrogen, it may wait until the filling process is completed, or when the hydrogen tank of the fuel cell vehicle 500 is not being filled with hydrogen, the hydrogen dispenser 400 may disconnect the fuel cell vehicle 500 from the low-pressure storage tank 310 and connect the fuel cell vehicle 500 to the medium-pressure storage tank 320 to try a filling process in operation 206.

Thereafter, it may be determined whether or not hydrogen stored in the medium-pressure storage tank 320 moves to the hydrogen tank of the fuel cell vehicle 500 in operation 207. In other words, it may be determined whether or not hydrogen stored in the medium-pressure storage tank 320 is being fed to the hydrogen tank of the fuel cell vehicle 500.

As a result of the determination in operation 207, when the hydrogen tank of the fuel cell vehicle 500 is being filled with hydrogen, it may wait until the filling process is completed, or when the hydrogen tank of the fuel cell vehicle 500 is not being filled with hydrogen, the hydrogen dispenser 400 may disconnect the fuel cell vehicle 500 from the medium-pressure storage tank 320 and connect the fuel cell vehicle 500 to the high-pressure storage tank 330 to try a filling process in operation 208.

Then, when the filling process is completed in operation 209, it may end. In other words, when hydrogen stored in the high-pressure storage tank 330 no longer moves to the hydrogen tank of the fuel cell vehicle 500, it may be determined that the filling process is completed, and the filling process may end.

In the above-described process, a hydrogen control unit (HCU) of the fuel cell vehicle 500 that detects an error in the IR communication may determine the temperature of the hydrogen tank periodically and output a warning signal through a cluster or a speaker in the vehicle when the temperature of the hydrogen tank exceeds a threshold value (for example, 85 degrees Celsius).

Hereinafter, the performance of a hydrogen filling method for a fuel cell vehicle according to embodiments of the present disclosure, will be detailed with reference to FIGS. 3 to 5.

Figure 3:
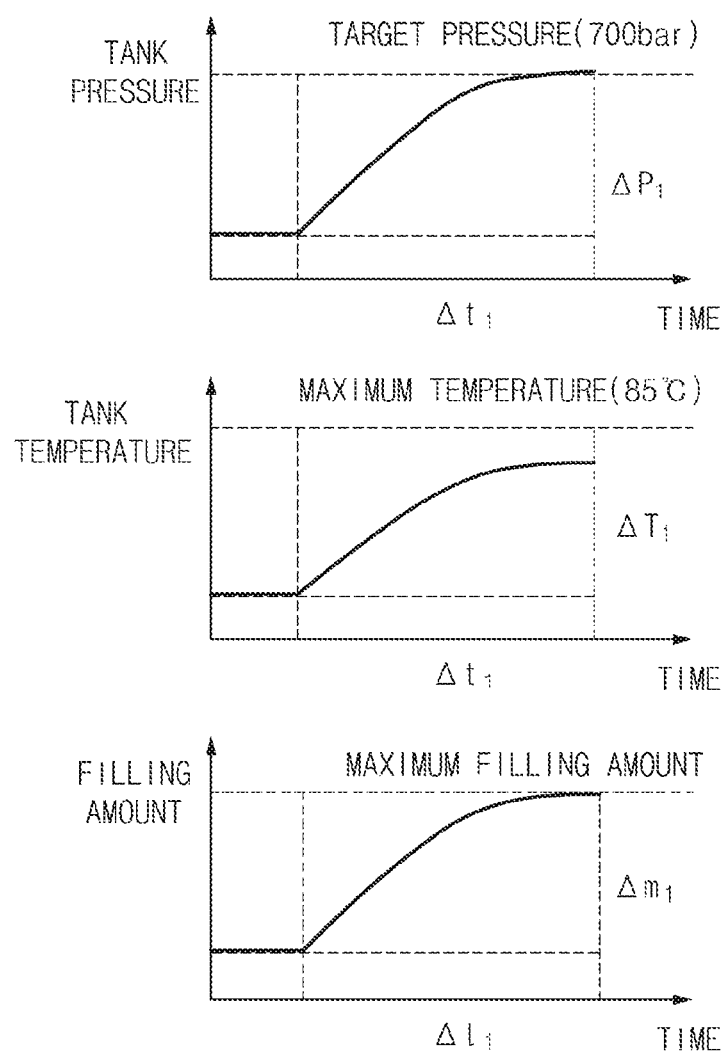
FIG. 3 illustrates the performance analysis of a hydrogen filling result when infrared (IR) communication is available.

FIG. 3 illustrates the performance analysis of a hydrogen filling result when IR communication is available. FIG. 4 illustrates the performance analysis of a hydrogen filling result when IR communication is unavailable in a conventional hydrogen filling method, and FIG. 5 illustrates the performance analysis of a hydrogen filling result when IR communication is unavailable in a hydrogen filling method according to embodiments of the present disclosure.

In FIG. 3, $\Delta t_1$ indicates a time taken for a pressure of the hydrogen tank to reach a target pressure (e.g., 700 bar) when IR communication is available, i.e., when the hydrogen dispenser 400 is normally operated. In addition, $\Delta t_1$ also indicates a time taken for a filling amount of the hydrogen tank to reach a maximum filling amount.

Figure 4:
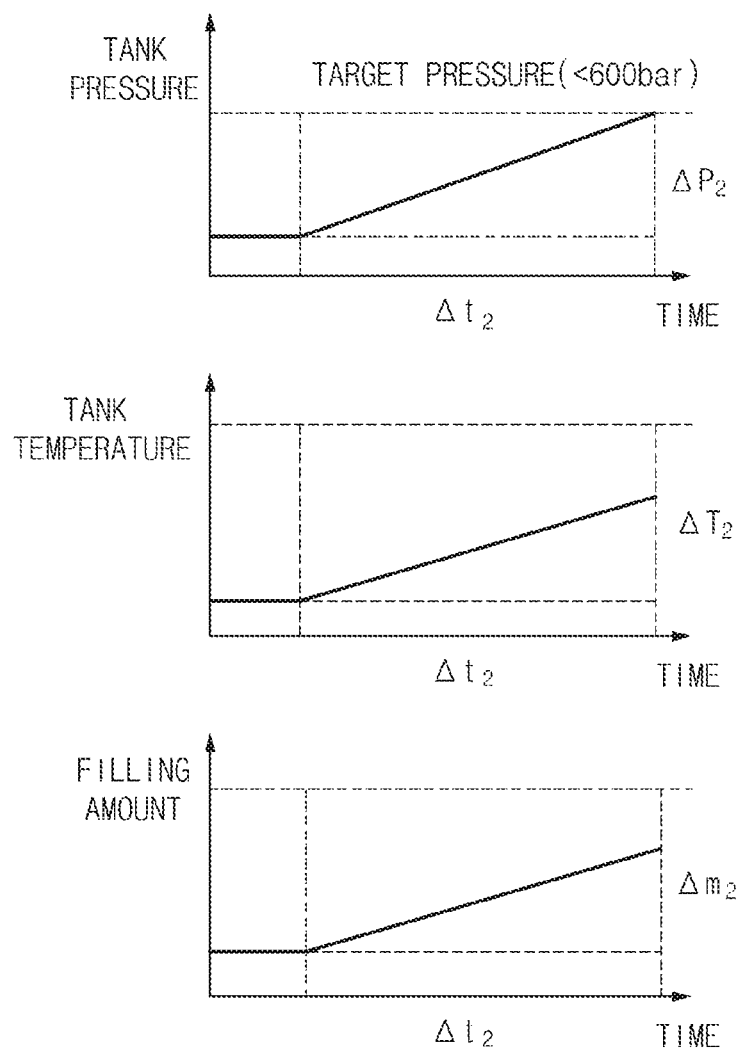
FIG. 4 illustrates the performance analysis of a hydrogen filling result when IR communication is unavailable in a conventional hydrogen filling method.

In FIG. 4, $\Delta t_2$ indicates a time taken for a pressure of the hydrogen tank to reach a target pressure (e.g., 600 bar) when IR communication is unavailable in the conventional hydrogen filling method. In addition, $\Delta t_2$ also indicates a time taken for a filling amount of the hydrogen tank to reach a maximum filling amount.

Figure 5:
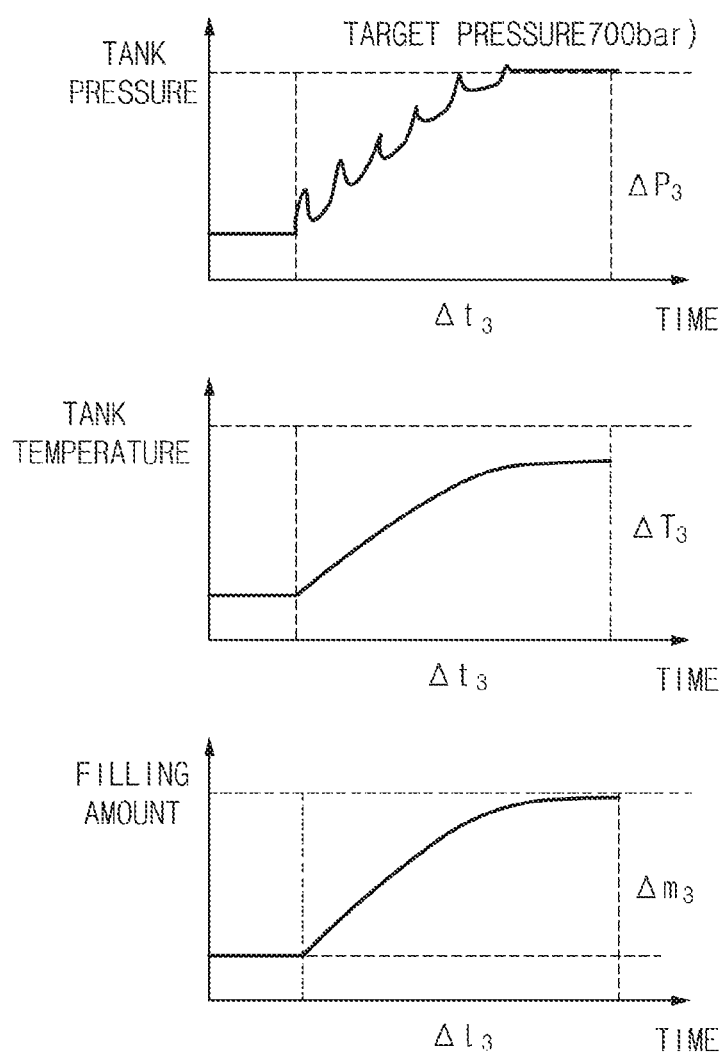
FIG. 5 illustrates the performance analysis of a hydrogen filling result when IR communication is unavailable in a hydrogen filling method according to embodiments of the present disclosure.

In FIG. 5, $\Delta t_3$ indicates a time taken for a pressure of the hydrogen tank to reach a target pressure (e.g., 600 bar) when IR communication is unavailable in the hydrogen filling method according to embodiments of the present disclosure. In addition, $\Delta t_3$ also indicates a time taken for a filling amount of the hydrogen tank to reach a maximum filling amount.

Moreover, relationships of time (t), pressure (P), temperature (T), and a filling amount (m) may satisfy the following equation:

$$\Delta t_1 \approx \Delta t_3 < \Delta t_2$$

$$\Delta P_1 = \Delta P_3 > \Delta P_2$$

$$\Delta T_2 < \Delta T_1 \approx \Delta T_3$$

$$\Delta m_1 = \Delta m_3 > \Delta m_2 \qquad \text{[Equation 1]}$$

Equation 1 may be expressed by specific values as illustrated in the following table 1 by way of example:

TABLE 1

| Items | IR Communication Available | IR Communication Unavailable | |
| --- | --- | --- | --- |
| Target Pressure | 700 bar | Less than 600 bar | 700 bar |
| Filling Time | within three minutes | at least ten minutes | within four minutes |
| Usable H₂ Fill Capacity | 5.4 kg | Less than 4.8 kg | 5.4 kg |
| Vehicle Fuel Economy | | 50 MPGe | |
| Mileage | 265 miles | Less than 235 miles | 265 miles |

Alternatively, according to embodiments of the present disclosure, when the compressor 200 does not perform a compression process periodically in order to maintain the pressure of the low-pressure storage tank 310 as a reference value (e.g., 200 bar) ("first reference pressure"), does not perform a compression process periodically in order to maintain the pressure of the medium-pressure storage tank 320 as a reference value (e.g., 500 bar) ("second reference pressure"), and does not perform a compression process periodically in order to maintain the pressure of the high-pressure storage tank 330 as a reference value (e.g., 700 bar) ("third reference pressure"), an additional compressor may be provided between the storage tank 300 and the dispenser 400. In this case, a process of filling the hydrogen tank of the fuel cell vehicle 500 with hydrogen will be detailed. Operations 201 to 207 may otherwise be the same in such case.

However, the additional compressor may be activated in operation 208 to help in filling the hydrogen tank of the fuel cell vehicle 500 with hydrogen. In other words, by setting a filling pressure of the compressor to a maximum filling pressure (for example, 700 bar) of the hydrogen tank of the fuel cell vehicle 500, the hydrogen tank of the fuel cell vehicle 500 may be fully filled with hydrogen.

Meanwhile, the above-stated method according to embodiments of the present disclosure may be written as a computer program. Codes and code segments constituting the program may easily be inferred by a computer programmer skilled in the art. In addition, the written program may be stored in a computer-readable recording medium (i.e., an information storage medium) and be read and executed by a computer, thereby implementing the method according to the exemplary embodiment of the present disclosure. The recording medium includes all types of computer-readable recording media.

As set forth above, by filling the hydrogen tank of the fuel cell vehicle with hydrogen while sequentially using the plurality of storage tanks (e.g., hydrogen storage tanks provided in the hydrogen station) having different levels of pressure, the hydrogen tank of the fuel cell vehicle may be filled with the maximum amount of hydrogen fuel quickly and safely even when it is difficult to monitor the pressure and temperature of the hydrogen tank from the fuel cell vehicle due to a communication error between the hydrogen dispenser and the fuel cell vehicle.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hydrogen filling method for a fuel cell vehicle, the method comprising:
    filling a hydrogen tank of the fuel cell vehicle using a low-pressure storage tank when there is an infrared (IR) communication error between a hydrogen dispenser and the fuel cell vehicle;
    filling the hydrogen tank using a medium-pressure storage tank unless hydrogen stored in the low-pressure storage tank feeds into the hydrogen tank;
    filling the hydrogen tank using the high-pressure storage tank unless hydrogen stored in the medium-pressure storage tank feeds into the hydrogen tank; and
    completing the filling of the hydrogen tank unless hydrogen stored in the high-pressure storage tank feeds into the hydrogen tank,
    wherein the fuel cell vehicle monitors a temperature of the hydrogen tank through a hydrogen control unit while being filled with hydrogen, and outputs a warning signal when the temperature of the hydrogen tank exceeds a threshold value.

2. The method according to claim 1, further comprising determining whether or not the hydrogen stored in any of the low-pressure storage tank, the medium-pressure storage tank, and the high-pressure storage tank moves to the hydrogen tank using a flowmeter.

3. The method according to claim 1, further comprising maintaining a first reference pressure in the low-pressure storage tank through a compressor.

4. The method according to claim 1, further comprising maintaining a second reference pressure in the medium-pressure storage tank through a compressor.

5. The method according to claim 1, further comprising maintaining a third reference pressure in the high-pressure storage tank through a compressor.

* * * * *